United States Patent
Pritchard et al.

(10) Patent No.: US 9,453,564 B1
(45) Date of Patent: Sep. 27, 2016

(54) ELECTRIC ALL-WHEEL DRIVE WITH TWO-SPEED DOUBLE REDUCTION PLANETARY

(71) Applicant: BorgWarner Inc., Auburn Hills, MI (US)

(72) Inventors: Larry A. Pritchard, Macomb, MI (US); Thaddeus R. Kopp, Oakland Township, MI (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 14/935,883

(22) Filed: Nov. 9, 2015

(51) Int. Cl.
| | |
|---|---|
| *F16H 48/08* | (2006.01) |
| *F16H 37/08* | (2006.01) |
| *F16H 3/48* | (2006.01) |
| *F16H 3/66* | (2006.01) |
| *B60K 17/356* | (2006.01) |
| *B60K 17/346* | (2006.01) |
| *F16H 37/04* | (2006.01) |
| *F16H 48/05* | (2012.01) |

(52) U.S. Cl.
CPC ......... *F16H 37/0813* (2013.01); *B60K 17/346* (2013.01); *B60K 17/356* (2013.01); *F16H 3/48* (2013.01); *F16H 3/66* (2013.01); *F16H 3/663* (2013.01); *F16H 48/08* (2013.01); *F16H 37/042* (2013.01); *F16H 37/082* (2013.01); *F16H 48/05* (2013.01); *F16H 2037/045* (2013.01)

(58) Field of Classification Search
CPC .. F16H 37/082; F16H 37/0813; F16H 48/05; F16H 48/08; F16H 37/042; F16H 2037/045
USPC ................................. 475/150, 200, 205, 221
See application file for complete search history.

(56) References Cited

U.S. PATENT DOCUMENTS

| | | | | |
|---|---|---|---|---|
| 3,744,760 A | * | 7/1973 | Uher ........................ | B66D 1/72 192/12 B |
| 5,728,022 A | * | 3/1998 | Schultz .................. | B60K 17/08 475/204 |
| 2007/0123383 A1 | * | 5/2007 | Yokoyama ............. | B60K 6/365 475/5 |
| 2009/0197727 A1 | * | 8/2009 | Janson ................... | B60K 6/365 475/5 |
| 2013/0130857 A1 | * | 5/2013 | Gassmann ............... | B60K 1/00 475/150 |
| 2013/0190124 A1 | * | 7/2013 | Gassmann ............... | B60K 1/00 475/150 |
| 2013/0203543 A1 | * | 8/2013 | Sten ........................ | F16H 48/36 475/150 |

OTHER PUBLICATIONS

U.S. Appl. No. 14/811,880, filed Jul. 29,2015 ;Title: Two Motor e-Assist AWD ; First named inventor: Larry A. Pritchard.
U.S. Appl. No. 14/824,595, filed Aug. 12, 2015: Title: Elecrtic Drive System ; First named inventor: Larry A. Pritchard.
U.S. Appl. No. 14/824,724, filed Aug. 12, 2015; Title: ECO Mode E-Assist;First named inventor: Larry A. Pritchard.

* cited by examiner

*Primary Examiner* — Roger Pang
(74) *Attorney, Agent, or Firm* — BrooksGroup

(57) ABSTRACT

A number of variations may include a product that may include a power transfer assembly. A gear train may have multiple gears and may provide a first stage gearing that may have a fixed gear ratio. At least one planetary gear set may provide a second stage gearing that may have multiple gear ratios. An electric machine may selectively provide input to the first stage gearing. A differential unit may selectively receive output from the planetary gear set. An engagement mechanism may selectively connect the differential unit with the second stage gearing in each of a high range mode and a low range mode.

19 Claims, 2 Drawing Sheets

ELECTRIC ALL-WHEEL DRIVE WITH TWO-SPEED DOUBLE REDUCTION PLANETARY

TECHNICAL FIELD

The field to which the disclosure generally relates includes vehicle drivelines and more particularly, includes vehicle drivelines with electric drive capability.

BACKGROUND

Vehicle drivelines may include a combustion engine, an electric motor or another power plant for propulsion. Hybrid vehicles may include a combination of different types of power plants. An all-wheel drive vehicle may include a connection between each wheel and one or more power plants.

SUMMARY OF ILLUSTRATIVE VARIATIONS

According to a number of illustrative variations, a product may include a power transfer assembly. A gear train may have multiple gears and may provide a first stage gearing that may have a fixed gear ratio. At least one planetary gear set may provide a second stage gearing that may have multiple gear ratios. An electric machine may selectively provide input to the first stage gearing. A differential unit may selectively receive output from the planetary gear set. An engagement mechanism may selectively connect the differential unit with the second stage gearing in each of a high range mode and a low range mode.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
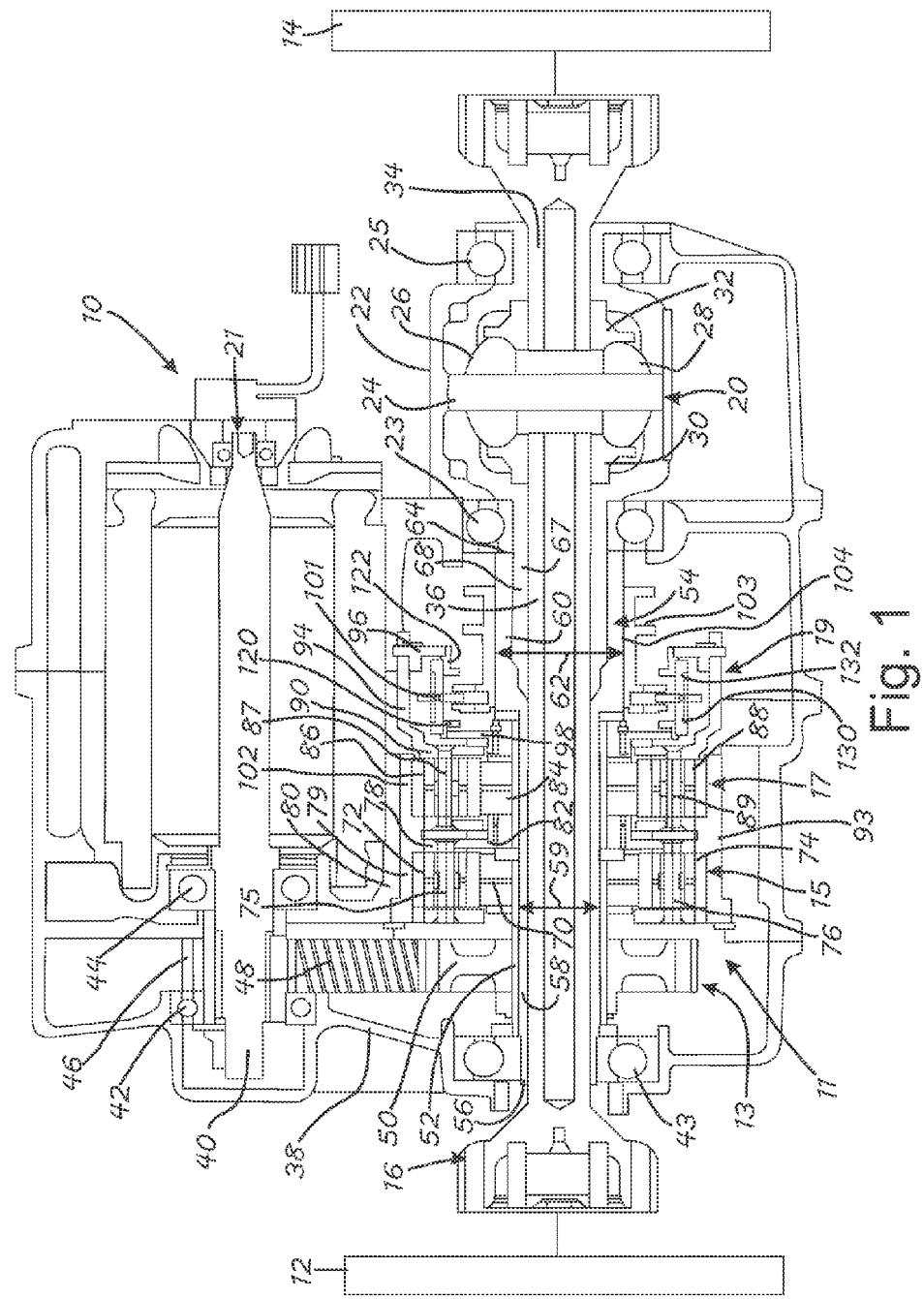
FIG. 1 is a schematic outline illustration, partially in cross section, of a product according to a number of variations.
Figure 2:
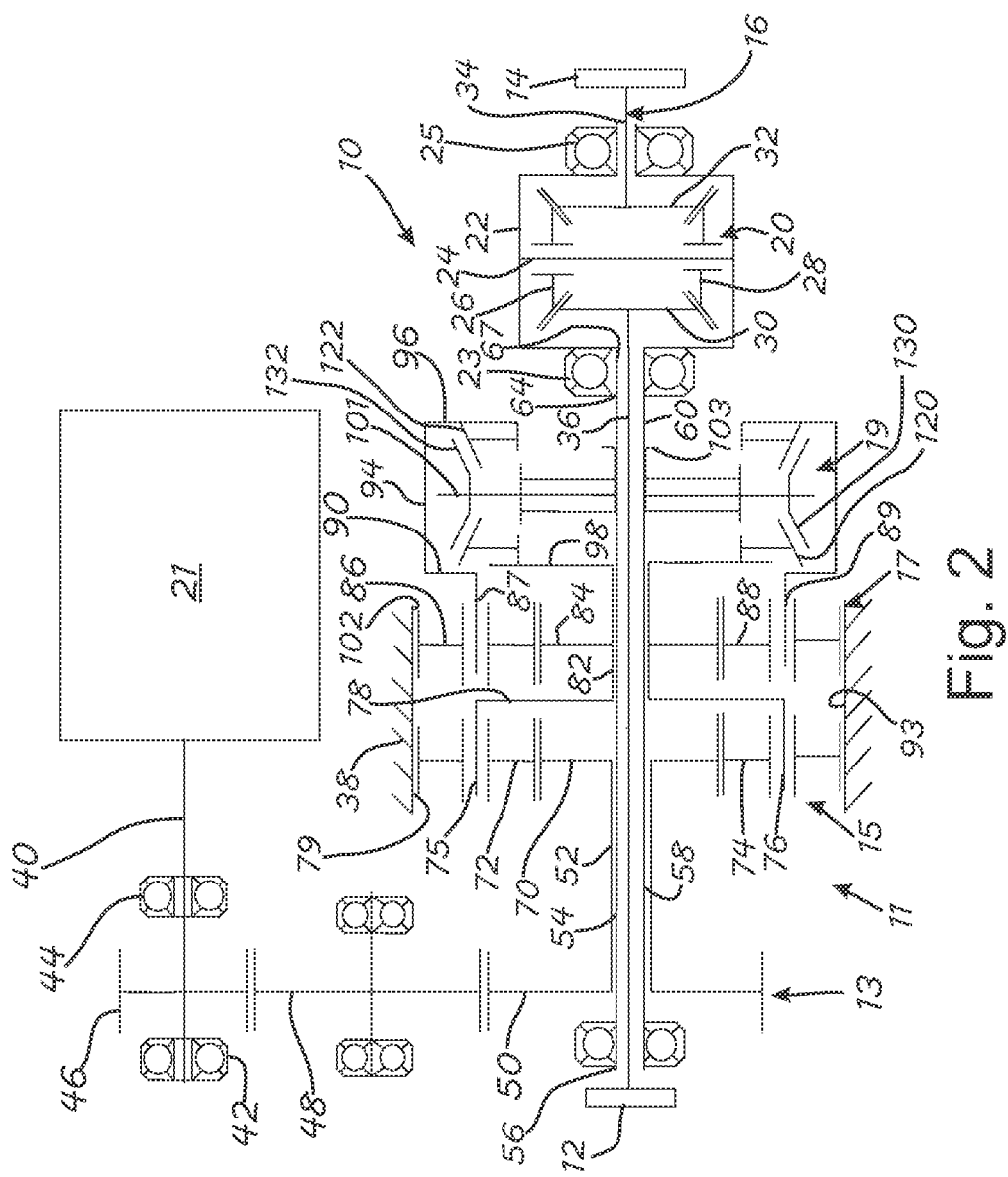
FIG. 2 is a schematic diagram illustration of the product of FIG. 1 according to a number of variations.

In a number of variations as illustrated in FIGS. 1 and 2, a product 10 may include a power transfer assembly 11. The power transfer assembly 11 may transfer power through a gear train 13, a first gear set 15, a second gear set 17, and an engagement mechanism 19. The gear train 13 may provide a first stage gearing and the pair of gear sets 15, 17 may provide a second stage gearing. The first stage gearing may provide a fixed gear ratio. The second stage gearing may provide multiple gear ratios so that the power transfer assembly 11 may provide a low range, a neutral mode and a high range between an electrical machine 21 and an axle assembly 16. Power may be transferred through the power transfer assembly 11 in both directions to drive the axle assembly 16 from the electric machine 21 such as for propulsion, or for the electric machine 21 to be driven by the axle assembly 16, such as for regenerative braking.

The product 10 may include road wheels 12 and 14 which may be connected to the axle assembly 16. The road wheels 12 and 14 may contact the surface upon which a vehicle that may include the product 10 operates. The axle assembly 16 may be included in a vehicle with multiple axle assemblies where one may be driven by a selected power plant such as an internal combustion engine and transaxle or another available option including alternative propulsion systems such as hybrid and electric. Another axle assembly may be driven by the product 10. The axle assembly 16 may include constant velocity joints and other typical components, which for simplicity are not illustrated, but which one skilled in the art would understand may be included.

In a number of variations the axle assembly 16 may include a differential unit 20. The differential unit 20 may include a cage 22 and may have a pinion shaft 24 that may be engaged at each of its ends with the cage 22. The cage 22 may be rotatable and may be carried by bearings 23 and 25. The pinion shaft 24 may carry a pinion gear 26 and a pinion gear 28, each of which may be rotatable on the pinion shaft 24. A side gear 30 may mesh with each of the pinion gears 26, 28 and another side gear 32 may mesh with each of the pinion gears 26, 28.

In a number of variations an axle shaft 34 may have an end that may be engaged with and may be connected directly to the side gear 32 to rotate therewith and may have its opposite end engaged directly or indirectly with the road wheel 14. An axle shaft 36 may have an end that may be engaged with, and may be directly connected with, the side gear 30 to rotate therewith and may have its opposite end engaged directly or indirectly with the road wheel 12. The axle shaft 36 may extend through the power transfer assembly 11. Rotation of the cage 22 may cause the pinion gears 26, 28 to rotate along with the side gears 30, 32, which may cause the axle shafts 22 and 36 to rotate driving the road wheels 12 and 14. When input may be provided from the road wheels 12 and 14, such as for regenerative braking, the axle shafts 22 and 36 may cause the side gears 30, 32 to rotate, which may rotate the pinion gears 26, 28, to rotate the cage 22.

In a number of variations the electrical machine 21 may be connected with the axle assembly 16 through the power transfer assembly 11. A housing assembly 38, may extend around the electrical machine 21, the power transfer assembly 11 and the differential unit 20 and may contain a lubricant such as oil. The housing assembly 38 may be comprised of a number of connected sections. The electrical machine 21 may be a motor or may be a motor-generator, or may be another type of electrical machine to provide power to the axle assembly 16 through the power transfer assembly 11 and the differential unit 20. A shaft 40, which may be a rotor shaft may extend from the electrical machine 21 and may be supported by bearings 42 and 44. A gear 46, which may be a helical gear may be fixed on the shaft 40 to rotate therewith and may provide input to and output from the electric machine 21.

In a number of variations the gear 46 may mesh with, and may be positively engaged to rotate with, a gear 48. The gear 48 may be a helical gear and may have a larger diameter than the gear 46 to provide a reduction there between from the shaft 40. The gear 48 may mesh with, and may be positively engaged to rotate with, a gear 50, which may also be a helical gear. The gear 48 may be an idler gear that may be engaged between the gears 46 and 50 and may rotate about a center that is offset behind the plane of the view in FIG. 1. This may allow the shaft 40 to be positioned close to the axle shaft 36 to minimize both the space between the gears 46 and 50 and packaging space requirements. The gear train 13 may be a helical gear train to provide ease of lubrication at high speed, because, as seen in FIG. 1, the gears 46, 48, 50 are relatively large and open as compared to other types of gear sets. The gears 46, 48 and 50 may be aligned in a parallel configuration, meaning they rotate around parallel axes. The gear 50 may be connected to rotate with a torque transfer element 52 that may be tubular in shape. In the gear train 13, the gear 46 may be an input gear when driven by the electric machine 21. The gear 48 may be an intermediate gear. The gear 50 may be an output gear from the gear train 13. When driving the electrical machine 21, such as by the axle assembly 16, the gear 50 may be an input gear. The gear 48 may be an intermediate gear. The gear 46 may be an output gear from the gear train 13.

In a number of variations the torque transfer element 52 may freely rotate on a shaft 54. The shaft 54 may be a hollow tubular shaft that may extend from a bearing 43 to the bearing 23. The shaft 54 may include a first end 56 supported within the bearing 43. The shaft 54 may include a first segment 58 that may have a first diameter 59, and that may extend from the end 56. The shaft 54 may have a second segment 60, which may have a second diameter 62 that is larger than the first diameter 59. The second segment 60 may have an end 64 that may contact the bearing 23. The end 64 may be a second end of the shaft 54 and may be opposite the end 56. The cage 22 of the differential unit 20 may include a shaft section 67 that may be connected with or may be integrally formed with the cage 22. The shaft section 67 may be a tubular hollow shaft that may include a section 68 that may be received within the second segment 60 of the shaft 54. The outside of the section 68 and the inside of the second segment 60 may be splined or otherwise formed so that the shafts 54 and 64 are engaged to rotate together.

In a number of variations the torque transfer element 52 may connect with, and may be positively engaged to rotate with a gear 70, so that the gear 50 and the gear 70 rotate in unison through the torque transfer element 52. The gear 70 may freely rotate on the first segment 58 of the shaft 54, which may extend through the gear 70. The gear 70 may be a sun gear in the gear set 15, which may be a planetary gear set. The gear 70 may mesh with, and may be positively engaged to rotate with gears 72 and 74. The gears 72, 74 may be planet gears and another number may be provided and may be engaged with the gear 70. The gears 72, 74 may rotate on pins 75 and 76, respectively, which may be fixed to a carrier 78. The gears 72, 74 may mesh with and may be positively engaged to rotate relative to a gear 79 which may be a ring or annulus gear and may include internal teeth. The gear 79 may be held or grounded to the housing assembly 38 at an extending annular wall 80 so that it may be fixed from rotation. The annular wall 80 may contact and may support the electric machine 21 on a side opposite the gear 79. Rotation of the gear 70 may cause the gears 72, 74 to rotate and to walk around the inside of the gear 79 which may cause the carrier 78 to rotate.

In a number of variations the carrier 78 may be engaged with a torque transfer element 82 so that the two may rotate together. The torque transfer element 82 may be an annular element that may rotate with the carrier 78 around the first segment 58 of the shaft 54, which may extend through the torque transfer element 82. The torque transfer element 82 may be formed integrally with the carrier 78 or may be connected thereto. The torque transfer element 82 may be connected to a gear 84 so that the two rotate together. The gear 84 may rotate around the first segment 58 of the shaft 54, which may extend through the gear 84. The gear 84 may be a sun gear in the gear set 17, which may be a planetary gear set. The gear 84 may mesh with, and may be positively engaged to rotate with gears 86 and 88. The gears 86 and 88 may be planet gears and another number may be provided and may be engaged with the gear 84. The gears 86, 88 may rotate on pins 87 and 89, respectively, which may be fixed to a carrier 90. The gears 86, 88 may mesh with and may be positively engaged to rotate relative to a gear 102 which may be a ring or annulus gear and may include internal teeth. The gear 102 may be held or grounded to the housing assembly 38 at the extending annular wall 80 so that it may be fixed from rotation. The gear 102 may be integrally formed with the gear 79 in a common ring 93. Rotation of the gear 84 may cause the gears 86, 88 to rotate and to walk around the inside of the gear 102 which may cause the carrier 90 to rotate.

In a number of variations the carrier 90 may be engaged with a torque transfer element 94 so that the two may rotate together. The torque transfer element 94 may be an annular element that may rotate with the carrier 90 around the first segment 58 of the shaft 54, which may extend through the torque transfer element 94. The torque transfer element 94 may be formed integrally with the carrier 90 or may be connected thereto and may extend axially from the carrier 90. The torque transfer element 94 may be connected to another torque transfer element 96 that may extend radially inward from the torque transfer element 94. The gear 84 may be connected to another torque transfer element 98 that may extend radially outward from the gear 84. The torque transfer element 98 and the gear 84 may rotate together.

In a number of variations the engagement mechanism 19 may include an engagement element 101 that may be fixed to rotate with a shift member 103. The shift member 103 may be a tubular shaped structure that may be supported on the second segment 60 of the shaft 54. The shift member 103 may be engaged with axially extending splines 104 on the second segment 60 so that the shift member 103 may slide on the second segment 60 and may rotate together with the shaft 54. The shaft 54 may extend through the torque transfer element 52, the gear 50, and through the gear sets 15, 17 and the engagement mechanism 19. The shaft 54 may be positioned in the product 10 so as to be disposed parallel to the shaft 40 of the electric machine 21 and to the axle shafts 34, 36 to provide efficient packaging within the housing 38. A number of bearings may be provided between the torque transfer element 52 and the shaft 54 for relative rotation there-between.

In a number of variations the engagement element 101 may be the hub of a dual cone type synchronizing clutch or synchronizer. The engagement mechanism 19 may be a cone clutch type synchronizer or another device capable of matching rotational speeds. Range selection may be performed by an actuator (not shown), that may move the shift member 103 to move the engagement element 101 axially on the second segment 60. The engagement mechanism 19 may include rings 120 and 122 that may be fixed to the respective torque transfer element 98 and the torque transfer element 96. A ring 130 may be positioned between the ring 120 and the engagement element 101, and a ring 132 may be positioned between the ring 122 and the engagement element 101. Friction material may be carried between corresponding mating surfaces of the rings 120, 130 and 122, 132. The shift member 103 may be moved to result in a transfer of torque between the engagement element 101 and the torque transfer element 98 by engaging the ring 130 with the ring 120. When the rings 130, 120 are engaged with each other, the rings 122, 132 may be disengaged from each other. The shift member 103 may center the engagement element 101 for neutral where both ring sets 120, 130 and 122, 132 are disengaged from each other. The shift member 103 may be moved to result in a transfer of torque between the engagement element 101 and the torque transfer element 96 by engaging the ring 122 with the ring 132. When the rings 122, 132 are engaged with each other, the rings 120, 130 may be disengaged from each other.

The engagement mechanism 19 may selectively disconnect the differential unit 20 from the electric machine 21 to provide a neutral mode, and may connect the electric machine 21 with the differential unit 20 to provide two operative modes of power transmission. The engagement element 101 may be selectively shifted to the left (in the perspective of the FIG. 1), by the shift member 103 to selectively connect the gear 84 with the differential unit 20. The engagement element 101 may be selectively shifted to the right (in the perspective of the FIG. 1), by the shift member 103 to selectively connect the carrier 90 with the differential unit 20. When input may be provided from the gear 84 to the differential unit 20, rotational speed from the gear 84 may be maintained for a high range mode of operation. When input may be provided from the carrier 90 to the differential unit 20, rotational speed from the gear 84 may be reduced and torque may be increased for a low range mode of operation. In the high range mode of operation, power may be provided from the electric machine 21 to the differential unit 20 in order through the shaft 40, the gear 46, the gear 48, the gear 50, the torque transfer element 52, the gear 70, the gears 72, 74, the carrier 78, the torque transfer element 82, the gear 84, the torque transfer element 98, the rings 120, 130, the engagement element 101, the shift member 103, the shaft 54 and the shaft section 67 to the cage 22. In the low range mode of operation, power may be provided from the electric machine 21 to the differential unit 20 through, in order, the shaft 40, the gear 46, the gear 48, the gear 50, the torque transfer element 52, the gear 70, the gears 72, 74, the carrier 78, the torque transfer element 82, the gear 84, the gears 86, 88, the carrier 90, the torque transfer elements 94, 96 the rings 122, 132, the engagement element 101, the shift member 103, the shaft 54 and the shaft section 67 to the cage 22.

In a number of variations the shift member 103 may be moved by an actuator (not shown), of a type known in the art, which may be a mechanical, electrical, magnetic, fluid, or another type of actuator, or a combination thereof. In a number of variations the shift member 103 may include an axially extending section 99 that may be tubular in shape and may be engaged with the second section 60 of the shaft 54 to rotate therewith and may be configured to slide thereon. For example, the internal surface of the axially extending section 99 may be provided with a keyway or grooves or another feature that mates with a key or ridges or another feature on the exterior surface of the second section 60 as one skilled in the art would understand. The axially extending section 99 may be connected to, or formed with, the engagement element 101.

Through the foregoing variations a vehicle may be provided with an axle assembly 16 that may be driven by an electrical machine 21 to provide electric all-wheel drive. The vehicle may be equipped with a second axle assembly driven by a conventional power plant to accomplish all-wheel drive. The axle assembly 16 may drive the electrical machine 21 to provide regenerative braking to charge the vehicle's battery. In addition, the axle assembly 16 may be driven by the electrical machine 21 to provide improved traction and vehicle dynamics. In particular, the axle assembly 16 may provide electric drive with improved torque in a low voltage system, such as a 48 volt system. The axle assembly 16 may be the rear axle in a front-wheel drive vehicle, the front axle in a rear-wheel drive vehicle, or another arrangement or a combination of propulsion sources may be used. The product 10 may include the gear train 13 providing a helical drop into a compound planetary arrangement comprising the gear sets 15, 17 to provide packaging advantages with reliable operation. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a power transfer assembly. A gear train may have multiple gears and may provide a first stage gearing that may have a fixed gear ratio. At least one planetary gear set may provide a second stage gearing that may have multiple gear ratios. An electric machine may selectively provide input to the first stage gearing. A differential unit may selectively receive output from the planetary gear set. An engagement mechanism may selectively connect the differential unit with the second stage gearing in each of a high range mode and a low range mode.

Variation 2 may include a product according to variation 1 wherein the gear train may include an input gear fixed to the electric machine. An intermediate gear may mesh with the input gear. An output gear may mesh with the intermediate gear. The output gear may be connected to one of the pair of planetary gear sets.

Variation 3 may include a product according to variation 1 wherein the differential unit may include a cage. A pinion shaft may be fixed to the cage. A pair of pinion gears may rotate on the pinion shaft. A pair of side gears may be engaged with the pair of pinion gears. The cage connected with the engagement mechanism.

Variation 4 may include a product according to variation 3 and may include a shaft that may be directly connected to one of the side gears. The shaft may extend through the engagement mechanism, the planetary gear set and one gear of the gear train.

Variation 5 may include a product according to variation 1 and may include a shaft that may extend into and may connect with the differential unit. The shaft may extend through one gear of the gear train.

Variation 6 may involve a product that may include an axle assembly that may be connected with a differential unit that may have a side gear. An electrical machine may be interconnected with the axle assembly through the differential unit. A power transfer assembly may be connected between the electrical machine and the differential unit. The power transfer assembly may comprise a pair of planetary gear sets. The product may provide a low range, a neutral mode and a high range between the electrical machine and the axle assembly. A shaft may extend through each of the planetary gear sets and into the differential unit. The shaft may be connected directly to the side gear of the differential unit.

Variation 7 may include a product according to variation 6 and may include an engagement mechanism through which the pair of planetary gear sets may be selectively connected with the differential unit. The shaft may extend through the engagement mechanism.

Variation 8 may include a product according to variation 7 wherein one of the pair of planetary gear sets may have a sun gear. A number of planet gears may mesh with the sun gear. A carrier may carry the number of planet gears. A first torque transfer element may connect the engagement mechanism with the carrier. A second torque transfer element may connect the engagement mechanism with the sun gear.

Variation 9 may include a product according to variation 6 and may include a gear train through which the electric machine may be engaged with the pair of planetary gear sets. The shaft may extend through one gear of the gear train.

Variation 10 may include a product according to variation 6 wherein the pair of planetary gear sets may include a pair of sun gears that may mesh with a number of planet gears. All of the planet gears may mesh with a single ring.

Variation 11 may involve a product that may include an electric machine that may have a rotor shaft. An axle assembly may have a first axle shaft and a second axle shaft. The rotor shaft may be disposed parallel to the first and second axle shafts. A differential unit may be disposed between and may be connected with the first and second axle shafts. A power transfer assembly may have a gear train, a first planetary gear set and a second planetary gear set. The rotor shaft may be connected with the differential unit through the gear train and the first and second planetary gear sets.

Variation 12 may include a product according to variation 11 and may include an engagement mechanism that may be connected between the second planetary gear set and the differential unit.

Variation 13 may include a product according to variation 12 wherein the first axle shaft may extend through the engagement mechanism, the first and second planetary gear sets and one gear of the gear train.

Variation 14 may include a product according to variation 11 and may include a tubular shaft. The first axle shaft may extend completely through the tubular shaft. The tubular shaft may extend through the first and second planetary gears sets and one gear of the gear train.

Variation 15 may include a product according to variation 11 wherein the differential unit may include a cage. The tubular shaft may be engaged with, and connected to, the cage.

What is claimed is:

1. A product comprising a power transfer assembly with a gear train that has multiple gears providing a first stage gearing that has a fixed gear ratio, at least one planetary gear set that provides a second stage gearing that has multiple gear ratios, an electric machine selectively providing input to the first stage gearing, a differential unit selectively receiving output from the planetary gear set, and an engagement mechanism selectively connecting the differential unit with the second stage gearing in each of a high range mode and a low range mode, wherein the electrical machine, the first stage gearing, the second stage gearing and the engagement mechanism are connected and arranged so that input from the electrical machine is delivered to the differential unit by traveling first through the first stage gearing, then traveling second through the second stage gearing, and then traveling third through the engagement mechanism to the differential unit.

2. The product according to claim 1 wherein the gear train includes an input gear fixed to the electric machine, an intermediate gear meshing with the input gear, and an output gear meshing with the intermediate gear, the output gear connected to one of the pair of planetary gear sets.

3. The product according to claim 1 wherein the differential unit includes a cage, a pinion shaft fixed to the cage, a pair of pinion gears rotating on the pinion shaft, and a pair of side gears engaged with the pair of pinion gears, the cage connected with the engagement mechanism.

4. The product according to claim 3 further comprising a shaft directly connected to one of the side gears, the shaft extending through the engagement mechanism, the planetary gear set and one gear of the gear train.

5. The product according to claim 1 wherein the input from the electrical machine travels from the second stage gearing to the differential only through the engagement mechanism.

6. A product comprising an axle assembly connected with a differential unit that has a side gear, an electrical machine interconnected with the axle assembly through the differential unit, a power transfer assembly connected between the electrical machine and the differential unit, the power transfer assembly comprising a pair of planetary gear sets, the product providing a low range, a neutral mode and a high range between the electrical machine and the axle assembly, and comprising a shaft extending through each of the planetary gear sets and into the differential unit, the shaft connected directly to the side gear of the differential unit wherein the pair of planetary gear sets includes a pair of sun gears meshing with a number of planet gears, all of the planet gears meshing with a single ring.

7. The product according to claim 6 further comprising an engagement mechanism through which the pair of planetary gear sets is selectively connected with the differential unit, the shaft extending through the engagement mechanism.

8. A product comprising an axle assembly connected with a differential unit that has a side gear, an electrical machine interconnected with the axle assembly through the differential unit, a power transfer assembly connected between the electrical machine and the differential unit, the power transfer assembly comprising a pair of planetary gear sets, the product providing a low range, a neutral mode and a high range between the electrical machine and the axle assembly, and comprising a shaft extending through each of the planetary gear sets and into the differential unit, the shaft connected directly to the side gear of the differential unit, an engagement mechanism through which the pair of planetary gear sets is selectively connected with the differential unit, the shaft extending through the engagement mechanism, wherein one of the pair of planetary gear sets has a sun gear, a number of planet gears meshing with the sun gear, and a carrier carrying the number of planet gears, and further comprising a first torque transfer element connecting the engagement mechanism with the carrier and a second torque transfer element connecting the engagement mechanism with the sun gear.

9. The product according to claim 6 further comprising a gear train through which the electric machine is engaged with the pair of planetary gear sets, the shaft extending through one gear of the gear train.

10. The product according to claim 6 wherein the pair of sun gears includes a first sun gear and a second sun gear and wherein the number of planet gears includes a first set of planet gears meshing with the first sun gear and includes a second set of planet gears meshing with the second sun gear, and comprising a carrier carrying the second set of planet gears, and an engagement mechanism that alternately connects the differential unit with the second sun gear or the second carrier.

11. A product comprising an electric machine that has a rotor shaft, an axle assembly that has a first axle shaft and a second axle shaft, the rotor shaft disposed parallel to the first and second axle shafts, a differential unit disposed between and connected with the first and second axle shafts, and a power transfer assembly that has a gear train, a first planetary gear set and a second planetary gear set, the rotor shaft connected with the differential unit through the gear train and the first and second planetary gear sets, with the first and second planetary gear sets connected in series so that power transfer from the rotor shaft to the differential unit first travels through the first planetary gear set and then travels through the second planetary gear set and further comprising an engagement mechanism connected between the second planetary gear set and the differential unit, wherein the engagement mechanism is positioned in-line between the second planetary gear set and the differential unit.

12. The product according to claim 11 wherein the power transfer from the rotor shaft to the differential unit, when moving from the second planetary gear set to the differential unit must travel through the engagement mechanism.

13. The product according to claim 12 wherein the first axle shaft extends through the engagement mechanism, the first and second planetary gear sets and one gear of the gear train.

14. The product according to claim 11 further comprising a tubular shaft, the first axle shaft extending completely through the tubular shaft, the tubular shaft extending through the first and second planetary gears sets and one gear of the gear train.

15. The product according to claim 11 wherein the first planetary gear set includes a first sun gear and a first set of planet gears meshing with the first sun gear, and the second planetary gear set includes a second sun gear and a second set of planet gears meshing with the second sun gear, and comprising a carrier carrying the second set of planet gears, and the engagement mechanism alternately connects the differential unit with the second sun gear or the second carrier.

16. The product according to claim 15 comprising a tubular shaft that is hollow and that connects the engagement mechanism with the differential unit, one of the first or second axle shafts extending through the tubular shaft.

17. The product according to claim 11 wherein input from the electrical machine travels from the second planetary gear set to the differential only through the engagement mechanism.

18. The product according to claim 11 wherein power input to the differential unit originates solely with the electric machine.

19. A product comprising an electric machine that has a rotor shaft, an axle assembly that has a first axle shaft and a second axle shaft, the rotor shaft disposed parallel to the first and second axle shafts, a differential unit disposed between and connected with the first and second axle shafts, and a power transfer assembly that has a gear train, a first planetary gear set and a second planetary gear set, the rotor shaft connected with the differential unit through the gear train and the first and second planetary gear sets, with the first and second planetary gear sets connected in series so that power transfer from the rotor shaft to the differential unit first travels through the first planetary gear set and then travels through the second planetary gear set, further comprising a tubular shaft, the first axle shaft extending completely through the tubular shaft, the tubular shaft extending through the first and second planetary gears sets and one gear of the gear train, wherein the differential unit includes a cage and wherein the tubular shaft is engaged with and fixedly connected to the cage.

* * * * *